(12) United States Patent
Tamaki

(10) Patent No.: US 8,800,026 B2
(45) Date of Patent: Aug. 5, 2014

(54) INFORMATION TERMINAL DEVICE AND METHOD OF PERSONAL AUTHENTICATION USING THE SAME

(75) Inventor: Makoto Tamaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/703,690

(22) PCT Filed: Jun. 13, 2011

(86) PCT No.: PCT/JP2011/063444
§ 371 (c)(1),
(2), (4) Date: Dec. 12, 2012

(87) PCT Pub. No.: WO2011/158768
PCT Pub. Date: Dec. 22, 2011

(65) Prior Publication Data
US 2013/0086671 A1      Apr. 4, 2013

(30) Foreign Application Priority Data
Jun. 18, 2010   (JP) ................................ 2010-139577

(51) Int. Cl.
*G06F 21/00*   (2013.01)
*H04L 29/06*   (2006.01)
*H04L 9/32*    (2006.01)

(52) U.S. Cl.
CPC .......... *H04L 63/0846* (2013.01); *H04L 9/3226* (2013.01)
USPC ............... 726/16; 726/17; 713/156; 713/157; 713/158; 713/182; 345/156; 345/173; 345/174; 345/178

(58) Field of Classification Search
CPC ......................... H04L 63/0846; H04L 9/3226
USPC ...................... 726/16–17; 713/156–158, 182; 345/156, 173–174, 178
See application file for complete search history.

(56) References Cited

U.S. PATENT DOCUMENTS

| | | | |
|---|---|---|---|
| 6,280,552 B1 * | 8/2001 | Bottari ........................... | 156/230 |
| 8,358,284 B2 * | 1/2013 | Jeong et al. ................... | 345/174 |

(Continued)

FOREIGN PATENT DOCUMENTS

| | | |
|---|---|---|
| JP | 2007-264929 A | 10/2007 |
| JP | 2007-531942 A | 11/2007 |

(Continued)

OTHER PUBLICATIONS

Adam J. Aviv et al., Smudge Attacks on Smartphone Touch Screens, 2010, pp. 1-10.*

(Continued)

*Primary Examiner* — Bradley Holder
*Assistant Examiner* — Fahimeh Mohammadi
(74) *Attorney, Agent, or Firm* — Keating & Bennett, LLP

(57) ABSTRACT

An information terminal device is provided that may use the input functionality of a touch panel to remove the restriction on the use thereof, for example, release the key lock. The information terminal device (1) is an information terminal device including a display (11) and a touch panel (12), including: a pattern storage memory (43) configured to store a release pattern that is to be entered into the touch panel (12) to remove the restriction on the use of the information terminal device, the release pattern being designated by a user as a graphic pattern; a comparison unit (44) configured to determine whether an entered pattern entered into the touch panel matches the release pattern; and a controller (34) configured to remove the restriction on the use of the information terminal device if the comparison unit (44) determines that the entered pattern matches the release pattern.

4 Claims, 15 Drawing Sheets

(56) References Cited

U.S. PATENT DOCUMENTS

| | | | |
|---|---|---|---|
| 2005/0008148 A1 | 1/2005 | Jacobson | |
| 2006/0075250 A1* | 4/2006 | Liao | 713/182 |
| 2007/0262964 A1* | 11/2007 | Zotov et al. | 345/173 |
| 2009/0006991 A1* | 1/2009 | Lindberg et al. | 715/763 |
| 2009/0083847 A1* | 3/2009 | Fadell et al. | 726/16 |
| 2009/0312065 A1 | 12/2009 | Wang et al. | |
| 2010/0026642 A1* | 2/2010 | Kim et al. | 345/173 |
| 2010/0187023 A1 | 7/2010 | Min | |
| 2010/0262591 A1* | 10/2010 | Lee et al. | 707/706 |
| 2010/0311470 A1* | 12/2010 | Seo et al. | 455/566 |
| 2011/0049807 A1* | 3/2011 | Benty et al. | 273/299 |

FOREIGN PATENT DOCUMENTS

| | | | |
|---|---|---|---|
| JP | 2009-303209 A | | 12/2009 |
| JP | 2010-003307 A | | 1/2010 |
| JP | 2010-500643 A | | 1/2010 |
| KR | 10-2009-0050280 | * | 6/2009 |
| WO | 2009/042392 A2 | | 4/2009 |

OTHER PUBLICATIONS

Mark Joselli et al., gRmobile: A Framework for Touch and Accelerometer Gesture Recognition for Mobile Games, Oct. 2009, IEEE, pp. 141-150.*

Yusuke Numabe et al., Finger Identification for Touch Panel Operation Using Tapping Fluctuation, May 2009, IEEE, pp. 899-902.*

Jae Gon Kim et al., Huffman User Interface for Full Touch Screen Based Mobile Phones, Feb. 2010, IEEE, vol. 2, pp. 1021-1026.*

Official Communication issued in International Patent Application No. PCT/JP2011/063444, mailed on Jul. 5, 2011.

* cited by examiner

INFORMATION TERMINAL DEVICE AND METHOD OF PERSONAL AUTHENTICATION USING THE SAME

TECHNICAL FIELD

The present invention relates to an information terminal device providing touch panel input functionality and, more particularly, to an information terminal device where restrictions on the use of the information terminal device (key lock, for example) can be removed in response to input via a touch panel, and a method of personal authentication using such a device.

BACKGROUND ART

Display devices using a touch panel as an input device are widely used in portable information terminals, for example. For example, JP 2009-303209 A discloses a portable communication terminal that displays, in an image display region, image data generated by a camera, generates touch data in response to input by a contact in a touch region mounted at the image display region, and stores the generated touch data together with the image data. When the image data is presented, this portable communication terminal enables display of touch data, such as a character or drawing, at the time of entry of touch data.

In recent years, along with increasingly advanced functionality of portable information terminals, the range of services that can be used on a portable information terminal has expanded. For example, a shopping site may be accessed on a portable information device to purchase goods, or various services by financial institutions, such as banks, may be used. In this context, to prevent an unauthorized user from using a portable information terminal, providing restrictions on the use or operation thereof by means of personal authentication has gained importance.

DISCLOSURE OF THE INVENTION

In view of the above problem, an object of the present invention is to provide an information terminal device that may use the input functionality of a touch panel to enable removal of restrictions on the use thereof, such as release of a key lock.

To achieve the above object, the information terminal device disclosed herein is an information terminal device including a display and a touch panel, including: a pattern storage memory configured to store a release pattern that is to be entered into the touch panel to remove a restriction on a use of the information terminal device, the release pattern being designated by a user as a graphic pattern; a comparison unit configured to determine whether an entered pattern entered into the touch panel matches the release pattern; and a controller configured to remove the restriction on the use of the information terminal device if the comparison unit determines that the entered pattern matches the release pattern.

According to the present invention, an information terminal device may be provided that achieves personal authentication with increased indecipherability for a third party by utilizing the input functionality of a touch panel to remove the restriction on the use thereof.

EMBODIMENTS FOR CARRYING OUT THE INVENTION

Figure 1:
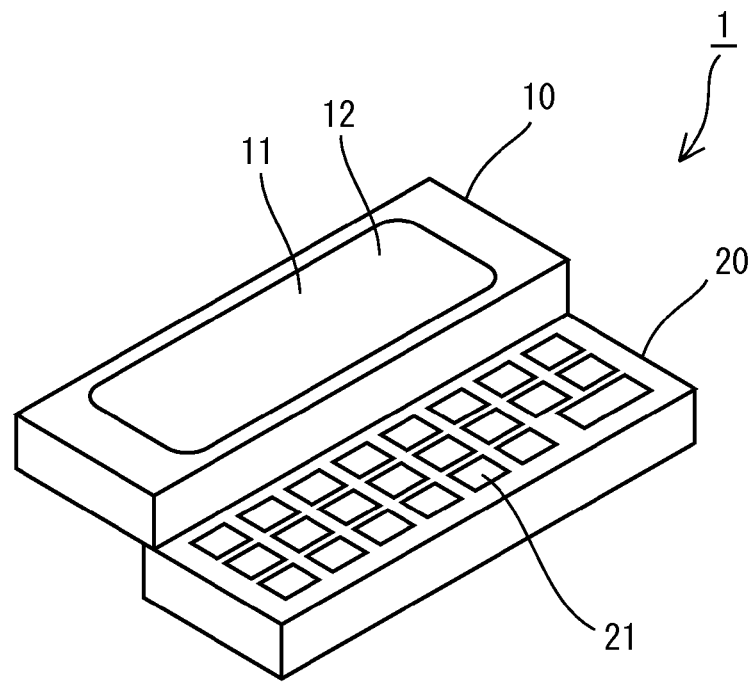
FIG. 1 is a schematic perspective view of an information terminal device according to a first embodiment, with the display slid off relative to the body.

The information terminal device according to an embodiment of the present invention is an information terminal device including a display and a touch panel, including: a pattern storage memory configured to store a release pattern that is to be entered into the touch panel to remove a restriction on a use of the information terminal device, the release pattern being designated by a user as a graphic pattern; a comparison unit configured to determine whether an entered pattern entered into the touch panel matches the release pattern; and a controller configured to remove the restriction on the use of the information terminal device if the comparison unit determines that the entered pattern matches the release pattern (first arrangement).

"Graphic pattern", as used herein, means any pattern drawn continuously or discontinuously on the touch panel. For example, a set of dots entered with a touch on the touch panel at a plurality of locations is included in "graphic pattern". Further, any pattern made up of lines drawn on the touch panel is included in graphic pattern. Of course, a pattern of a combination of dots and lines is included in graphic pattern. According to the first arrangement, it is possible to provide a large number of variations of release patterns while making it easier for a user of the information terminal device to memorize a release pattern, compared with implementations that use a release pattern in the form of a password made of a combination of numbers and characters. Thus, an information terminal device is provided that achieves personal authentication with increased indecipherability for a third party.

In the information terminal device according to the first arrangement above, it is preferable that the pattern storage memory stores an input request pattern suggesting that the release pattern be entered, and the input request pattern is displayed on the display when the restriction on the use of the information terminal device is to be removed (second arrangement). According to the second arrangement, the user tries to enter a release pattern while looking at the displayed input request pattern. The input request pattern may give the user a clue. Such a pattern will assist the user in recalling the correct release pattern. Conversely, the input request pattern may intentionally mislead the user to the wrong pattern. Such a pattern will make it difficult for an invalid user to guess the correct release pattern, thereby increasing indecipherability.

In the information terminal device according to the second arrangement above, it is preferable that the pattern storage memory stores a set of input request patterns suggesting that the release pattern be entered, and an input request pattern selected from the set of input request patterns is displayed on the display when the restriction on the use of the information terminal device is to be removed (third arrangement). According to the third arrangement, an input request pattern selected from a plurality of input request patterns is displayed, making it more difficult for an invalid user to guess the correct release pattern than in an implementation where the same input request pattern is always displayed, thereby further increasing indecipherability.

In the information terminal device according to the second or third arrangement above, it is preferable that the input request pattern includes a set of input suggestion regions suggesting that the release pattern be entered, and the release pattern is based on one or more input suggestion regions selected from the set of input suggestion regions (fourth arrangement). According to the fourth arrangement, the release pattern is based on at least one selected from a plurality of input suggestion regions, thereby increasing the number of possible variations of release patterns. This will make it difficult for an invalid user to guess the correct release pattern, thereby increasing indecipherability.

In the information terminal device according to the second or third arrangement above, it is preferable that the input request pattern includes a plurality of input suggestion regions suggesting that the release pattern be entered, and the release pattern is based on at least one of the input suggestion regions and a region outside the input suggestion regions (fifth arrangement). According to the fifth arrangement, the release pattern is based on one of the input suggestion regions and a region outside the input suggestion regions. It is very difficult for an invalid user to enter the portion of the correct release pattern that lies outside the input suggestion regions, while the valid user can do so based on his own memories of the time when he designated the release pattern.

In the information terminal device according to the second or third arrangement above, it is preferable that the input request pattern includes a plurality of input suggestion regions suggesting that the release pattern be entered, and the release pattern is a pattern that only passes one or more of the input suggestion regions (sixth arrangement). According to the sixth arrangement, it is still more difficult for an invalid user to guess the release pattern based on the input suggestion regions.

In the information terminal device according to the second or third arrangement above, it is preferable that the input request pattern includes an input suggestion region suggesting that the release pattern be entered, and the release pattern is a pattern located outside the input suggestion region (seventh arrangement). According to the seventh arrangement, the release pattern is a pattern located outside the input suggestion region, something that defies expectations of the human mind, thereby achieving yet increased indecipherability. In the context of human psychology, a person generally assumes that, when an input suggestion region is displayed, he is supposed to enter something in this input suggestion region.

As such, intentionally placing a release pattern outside the input suggestion region will make it difficult for a third party to guess the release pattern.

In the information terminal device according to the second or third arrangement above, it is preferable that a board for a board game is displayed as the input request pattern, and the release pattern is a movement of one of figures used for the board game (eighth arrangement). The movement of the figure that defines the release pattern may comply with the actual rules of movement of this particular figure in the board game to help the user memorize the release pattern. Conversely, the movement of the figure that defines the release pattern may not comply with the actual rules of movement of this figure in the board game. This is something that defies expectations of the human mind and achieves increased indecipherability. In the context of human psychology, a person generally assumes that, when a figure for a board game is displayed, a release method is used that is consistent with the rules of movement of that figure. As such, intentionally defining a movement that does not comply with the rules as a release pattern will make it difficult for a third party to guess the release pattern.

In the information terminal device according to any one of the first to eighth arrangements above, it is preferable that a pattern generating unit is further included that is configured to generate the release pattern based on a pattern entered by the user into the touch panel and stores it into the pattern storage memory (ninth arrangement). According to the ninth arrangement, it is possible to use a release pattern generated based on a pattern entered by the user himself. This will increase indecipherability regarding release patterns for a third party who is not the user.

EMBODIMENTS

More detailed embodiments of the present invention will now be described with reference to the drawings. For ease of explanation, the drawings to which reference will be made schematically show only those components of the embodiments of the present invention that are necessary to describe the present invention.

First Embodiment

Configuration of Information Terminal Device

Figure 2:
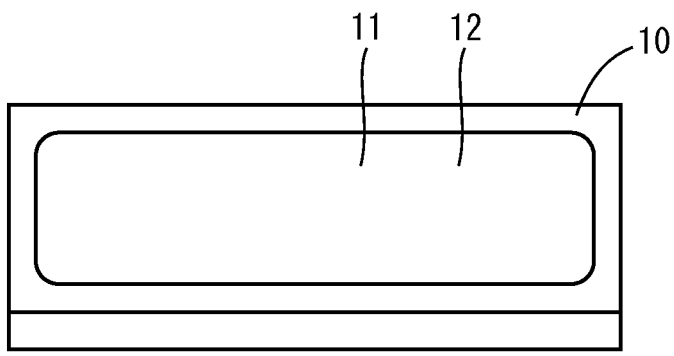
FIG. 2 is a schematic front view of the information terminal device according to the first embodiment, with the display slid onto the body.

First, a schematic configuration of an information terminal device of a first embodiment of the present invention will be described with reference to FIGS. 1 and 2. FIGS. 1 and 2 schematically show an information terminal device 1 of an embodiment of the present invention.

As shown in FIG. 1, the information terminal device 1 of the present embodiment includes a display 10 and a body 20. The display 10 is slidable relative to the body 20. That is, FIG. 1 is a perspective view illustrating the device with the display 10 slid off relative to the body 20 such that a keyboard 21 of the body 20 is ready for use. FIG. 2 is a front view of the device with the display 10 slid onto the body 20. Although the example of FIG. 1 illustrates an arrangement where the display 10 is slidable in a direction parallel to the short sides of the information terminal device 1, the display 10 may be slidable in a direction parallel to the long sides or in other directions (for example, orthogonally).

The display 10 includes a liquid crystal display 11 and a touch panel 12 provided on a surface of the liquid crystal display 11. Although this embodiment illustrates an arrangement where the display 10 includes a liquid crystal display 11, displays other than liquid crystal displays may be used.

The body 20 includes, in its interior, a battery, memory and various control circuits and includes the keyboard 21 on its surface. Any type of keyboard 21 may be used depending on the application of the information terminal device 1. The keyboard 21 includes, for example, a numeric keypad that can be mainly used to enter phone numbers, for example, or a numeric keypad that allows both numbers and characters to be entered and function keys associated with various functions. Alternatively, the keyboard 21 may be a so-called full keyboard.

The information terminal device 1 may be used for any application. The information terminal device 1 may be used for various applications including, but not limited to, cell phone, personal digital assistant (PDA), smartphone, electronic dictionary, portable game machine, music/video player, personal computer, and e-book reader applications, for example.

The touch panel 12 detects that a finger or stylus is in contact with or adjacent to its surface and outputs information containing the coordinates of the corresponding location. Based on these coordinates, computing circuits as described below are capable of determining where in the touch panel 12 what pattern has been entered.

The touch panel 12 is not limited to any particular type and a touch panel of any type may be used. Types of the touch panel 12 that can be used include, but are not limited to, resistive, capacitive, electromagnetic induction type, infrared type, surface acoustic wave (ultrasonic wave) type, and image recognition type touch panels using photosensors, for example. An image recognition type touch panel using photosensors may even be a liquid crystal display 11 with touch panel functionality where the photosensors are not deposited on the surface of the liquid crystal display 11 but are incorporated within the liquid crystal display 11. Such photosensors may include, for example, photodiodes, phototransistors, CCD devices, CMOS devices or the like.

Figure 3:
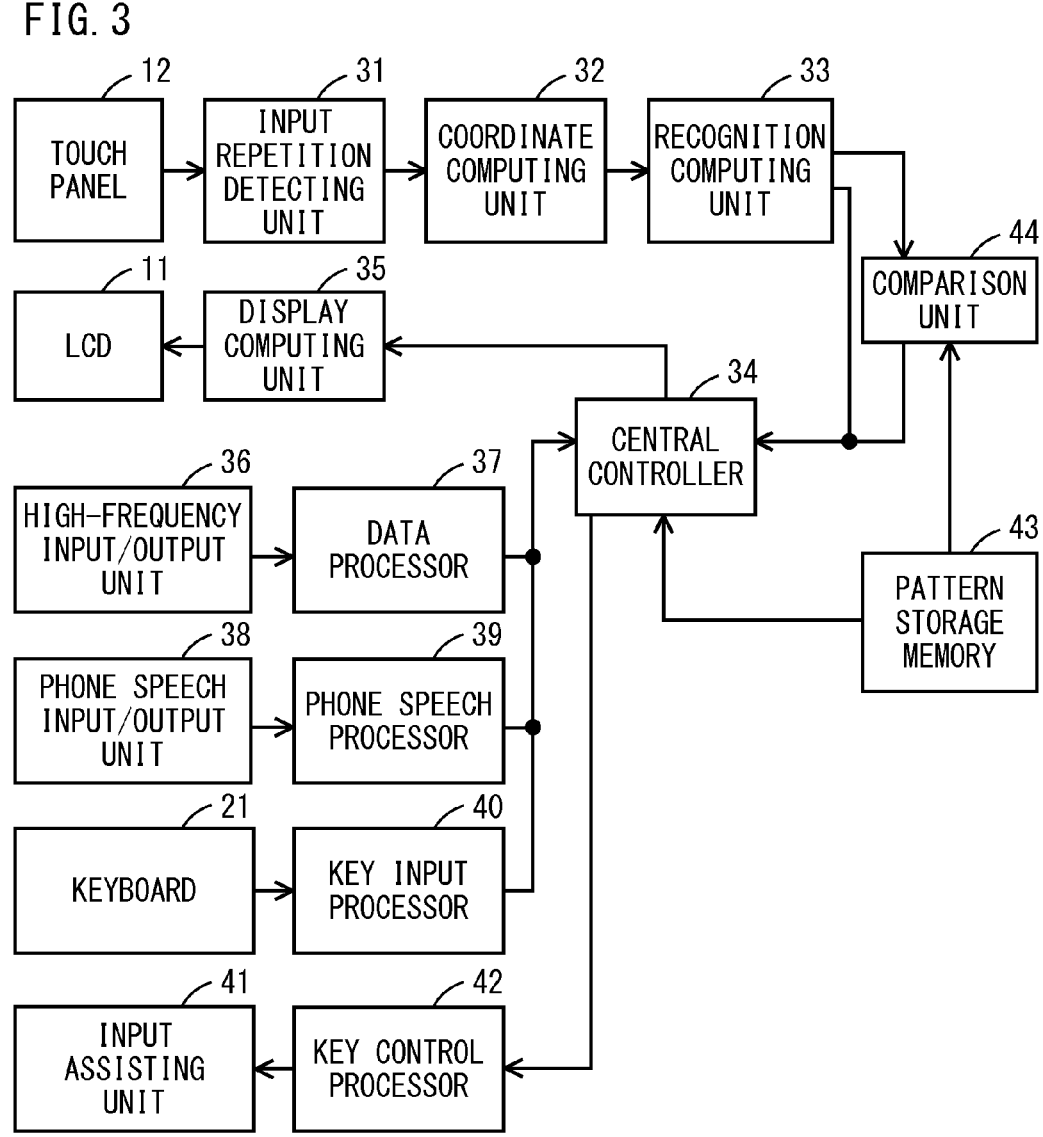
FIG. 3 is a block diagram showing the functional configuration of the information terminal device 1.

Now, referring to FIG. 3, the functional configuration of the information terminal device 1 will be described. FIG. 3 is a block diagram illustrating the functional configuration of the information terminal device 1. As shown in FIG. 3, the information terminal device 1 includes an input repetition detecting unit 31, coordinate computing unit 32, recognition computing unit 33, central controller 34, display computing unit 35, high-frequency input/output unit 36, data processor 37, phone speech input/output unit 38, phone speech processor 39, key input processor 40, input assisting unit 41, key control processor 42, pattern storage memory 43, and comparison unit 44. The present implementation illustrates an information terminal device 1 providing telephone functionality; however, telephone functionality is not required. As such, the phone speech input/output unit 38 and phone speech processor 39 may be omitted. When an information terminal device 1 is implemented, any component not shown in FIG. 3 may be additionally included depending on the function required of the device.

If an input with a finger or stylus occurs repeatedly within a unit of time, the input repetition detecting unit 31 detects this input. That is, the input repetition detecting unit 31 serves to determine whether a touch is an unintended, accidental one or a valid one intended as an input. When the input repetition detecting unit 31 detects a repeated input, the coordinate computing unit 32 computes the coordinates of the location where the input occurred. The coordinates computed by the coordinate computing unit 32 is forwarded to the recognition computing unit 33. Based on the coordinates received from the coordinate computing unit 32, the recognition computing unit 33 determines whether a dot or a line was entered as the input.

The central controller 34 receives information from various units and controls the units based on the received information to control the operations of the entire information terminal device 1.

The display computing unit 35 computes image data to be displayed on the liquid crystal display 11 and computes data for controlling display and other operations of the liquid crystal display 11.

The high-frequency input/output unit 36 sends and receives signals via a cellphone antenna or through wireless communication, for example. The data processor 37 processes various data to be sent, or data received, by the high-frequency input/output unit 36. For example, it processes packets to be sent, or packets received, through packet communication and, if necessary, encrypts and decrypts data, and performs other operations.

The phone speech input/output unit 38 sends and receives phone speech via the cellphone antenna. The phone speech processor 39 samples or reconstructs speech to be sent, or speech received, by the phone speech input/output unit 38.

The key input processor 40 performs keyboard scanning on the keyboard 21 and, based on the location of any pressed key and the time when it was pressed, identifies in time-series the character, number or function that was entered. This process provides input data from the keyboard 21. The input assisting unit 41, under the control of the key control processor 42, causes the keys of the keyboard 21 to be illuminated and/or produce a beep when a key is pressed to prevent erroneous operations.

The pattern storage memory 43 stores an input request pattern that will be used when the key lock is to be released and a lock release pattern that a user registers in advance. The comparison unit 44 compares a pattern entered via the touch panel 12 with the lock release pattern registered in the pattern storage memory 43 and, if they match each other, releases the key lock.

[Key Lock Release]

Key lock release involving the use of the touch panel 12 in such an information terminal device 1 will now be described. The information terminal device 1 is configured such that it does not accept a key input from the keyboard 21 if the key lock has not been released based on an input via the touch panel 12. Preferably, the device is also configured such that, after the key lock is released, the key lock is placed again automatically when the device is not operated for a predetermined period of time.

The information terminal device 1 displays a key lock release screen on the liquid crystal display 11 when, for example, the device is powered on or the finger or stylus touches the touch panel 11 when the device is in power save mode (i.e. the liquid crystal display 11 is off).

Figure 4:
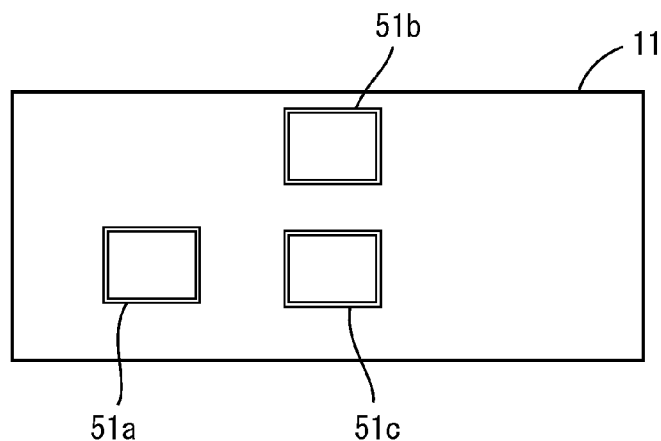
FIG. 4 is a schematic diagram illustrating an example of a key lock release image.

FIG. 4 is a schematic diagram illustrating an example of a key lock release screen. The example of FIG. 4 shows an input request pattern having three input suggestion regions 51a, 51b and 51c on the liquid crystal display 11. This key lock release screen is displayed under the control of the central controller 34 and display computing unit 35, using an input request pattern stored in the pattern storage memory 43. Although in the example shown in FIG. 4, rectangular input suggestion regions 51a to 51c, defined by double lines, are displayed, any number of input suggestion regions of any shape and size may be included in the input request pattern. One type of input request pattern includes one or more input suggestion regions consistent with a lock release pattern used to release the key lock and gives a person trying to release the key lock a clue to the lock release pattern. Another type of input request pattern includes one or more input suggestion regions that are not consistent with a lock release pattern to make it difficult to guess the lock release pattern.

As discussed above, the pattern storage memory 43 stores, in advance, a lock release pattern used to release the key lock. The valid user of the information terminal device 1 registers, in advance, a lock release pattern that he decides on. When the key lock release screen is displayed, the key lock is released if the registered lock release pattern is entered correctly. Conversely, the key lock is not released if the entered pattern is different from the registered lock release pattern.

[Relationships between Lock Release Patterns and Entered Patterns]

Now, several exemplary relationships between lock release patterns and entered patterns will be illustrated. In the examples below, a circle shown in FIG. 5A and onward represents, in a schematic manner, the location where a touch input occurs and does not indicate the actual size of the contact that a stylus or the like touches.

Figure 5A:
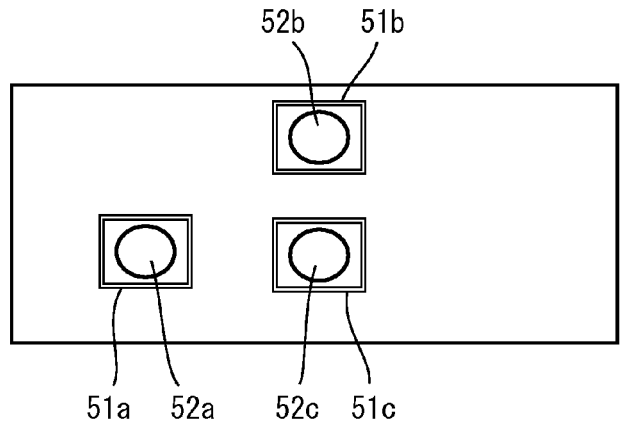
FIG. 5A is a diagram illustrating an example of a lock release pattern, as if the pattern were displayed.

For example, in the example of FIG. 5A, a pattern including all the input suggestion regions 51a to 51c of the input request pattern is registered as a lock release pattern. That is, in the example of FIG. 5A, the key lock is released if one touch input occurs on each of the input suggestion regions 51a to 51c, as indicated by the circles 52a to 52c. As a condition for key lock release, a certain order of touch of the input suggestion regions 51a to 51c forming the lock release pattern may be determined, or these regions may be touched in any order. In the former case, information on the order in which the input suggestion regions 51a to 51c should be touched must be registered in the pattern storage memory 43.

Figure 5B:
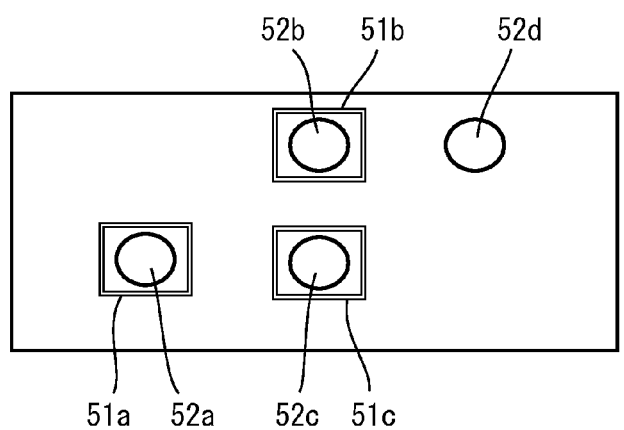
FIG. 5B is a diagram illustrating an example of an entered pattern differing from the lock release pattern of FIG. 5A, where the key lock will not be released.
Figure 5C:
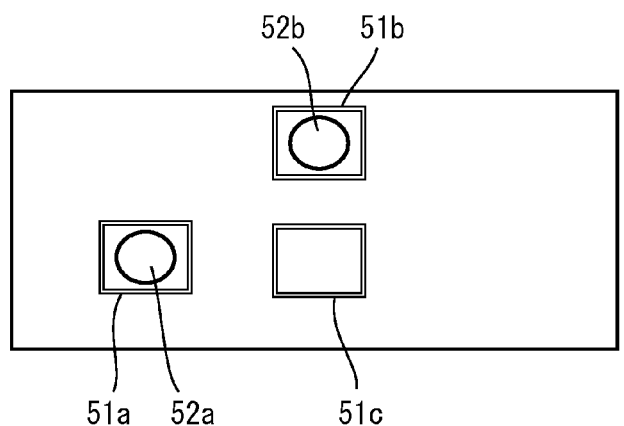
FIG. 5C is a diagram illustrating another example of an entered pattern differing from the lock release pattern of FIG. 5A, where the key lock will not be released.

If, in the case of the lock release pattern shown in FIG. 5A, an unnecessary touch input occurs at a location not included in the lock release pattern, as shown in FIG. 5B and indicated by the circle 52d, for example, the comparison unit 44 determines that the entered pattern does not match the lock release pattern. This result is sent by the comparison unit 44 to the central controller 34, which determines that the key lock should not be released. If no touch input occurs in an input suggestion region 51c which is included in the lock release pattern, as shown in FIG. 5C, the comparison unit 44 also determines that the entered pattern does not match the lock release pattern.

Figure 6A:
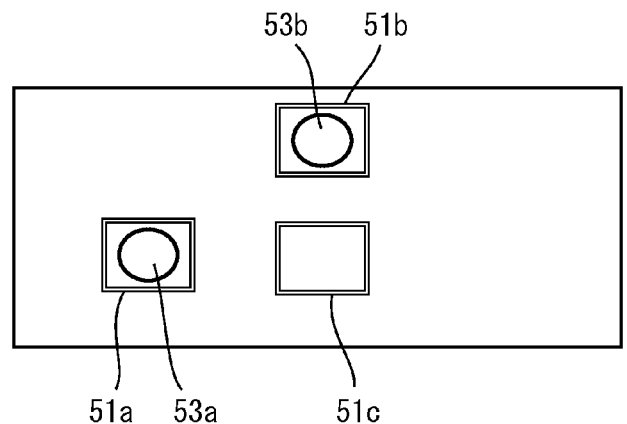
FIG. 6A is a diagram illustrating another example of a lock release pattern, as if the pattern were displayed.

In the example of FIG. 6A, out of the input suggestion regions 51a to 51c of the input request pattern, only the input suggestion regions 51a and 51b are included in the lock release pattern. As such, in the example of FIG. 6A, the key lock is released if one touch is made on each of the input suggestion regions 51a and 51b, as indicated by the circles 53a and 53b. The key lock is not released if no touch input occurs in at least one of the input suggestion regions 51a and 51b included in the lock release pattern.

Figure 6B:
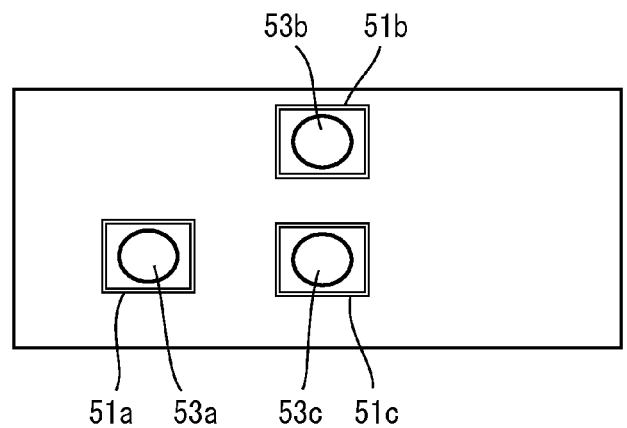
FIG. 6B is a diagram illustrating an example of an entered pattern differing from the lock release pattern of FIG. 6A, where the key lock will not be released.
Figure 6C:
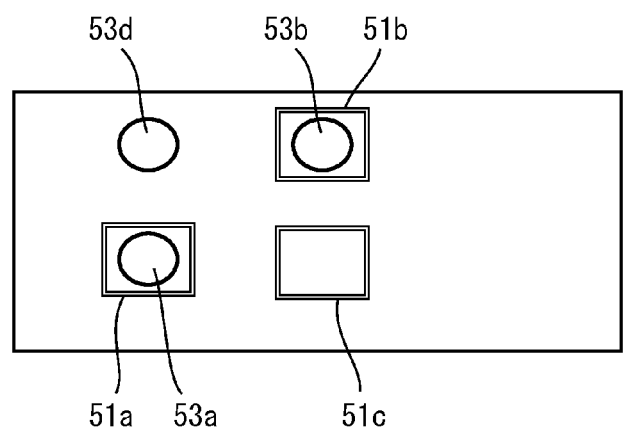
FIG. 6C is a diagram illustrating another example of an entered pattern differing from the lock release pattern of FIG. 6A, where the key lock will not be released.

In this implementation, if an unnecessary touch input occurs in the input suggestion region 51c, which is not included in the lock release pattern, as indicated by the circle 53c in FIG. 6B, the comparison unit 44 determines that the entered pattern does not match the lock release pattern. Thus, in this scenario, the key lock is not released. Similarly, if a touch input occurs at a location outside the input suggestion regions in addition to the input suggestion regions 51a and 51b, as included by the circle 53d in FIG. 6C, the comparison unit 44 determines that the entered pattern does not match the lock release pattern. Thus, the key lock is not released in this scenario, too.

Figure 7A:
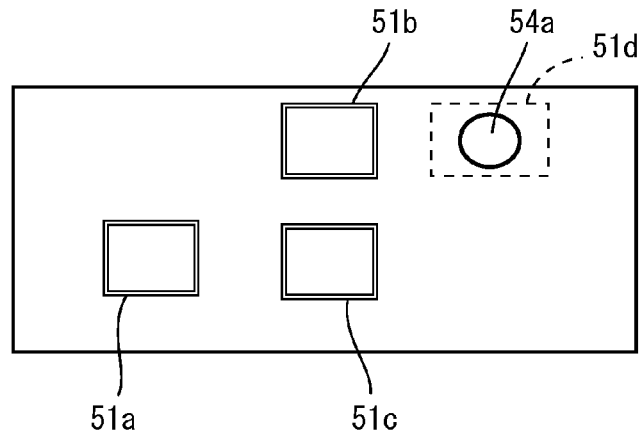
FIG. 7A is a diagram illustrating still another example of a lock release pattern, as if the pattern were displayed.

In the example of FIG. 7A, the region 51d outside the input suggestion regions 51a to 51c is registered as a lock release pattern. Although the region 51d of FIG. 7A is included in the lock release pattern, it is not displayed in the form of an input suggestion region of the input request pattern. That is, although the region 51d is indicated by broken lines in FIG. 7A, it is not displayed on an actual screen. As such, the user must perform a touch input in the region 51d, as schematically indicated by the circle 54a in FIG. 7A, solely based on his memory. Of course, the key lock is not released unless a touch input occurs in the region 51d. As at least part of the lock release pattern may be located outside the input suggestion regions, it is very difficult for a third party to identify the lock release pattern, while the valid user of the information terminal device 1 can release the key lock based on his memory.

Figure 7B:
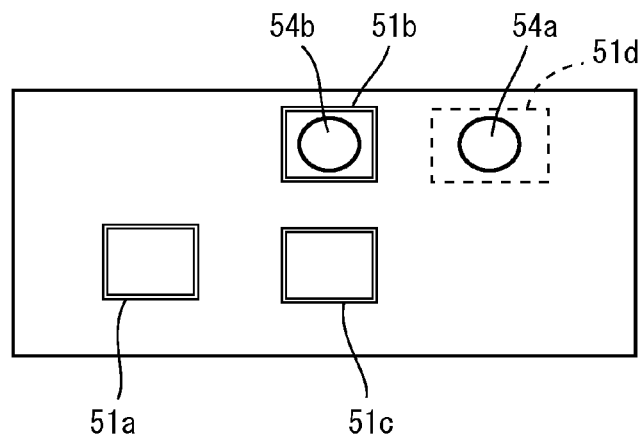
FIG. 7B is a diagram illustrating an example of an entered pattern differing from the lock release pattern of FIG. 7A, where the key lock will not be released.
Figure 7C:
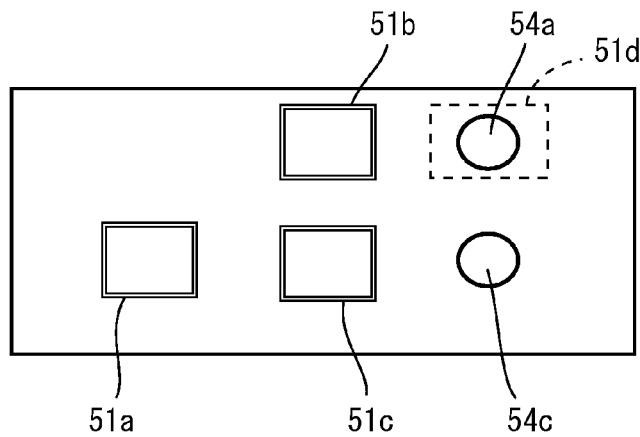
FIG. 7C is a diagram illustrating another example of an entered pattern differing from the lock release pattern of FIG. 7A, where the key lock will not be released.

In this scenario, too, the key lock is not released if, as shown in FIGS. 7B and 7C, an unnecessary touch input occurs at a location not included in the lock release pattern (see the circle 54b of FIG. 7B and the circle 54c of FIG. 7C) in addition to the region 51d.

Figure 8A:
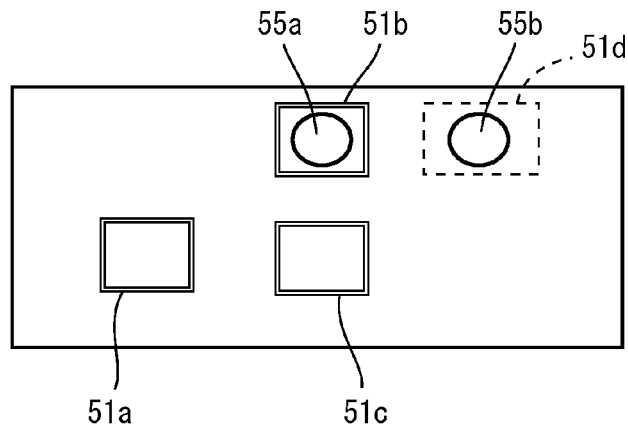
FIG. 8A is a diagram illustrating yet another example of a lock release pattern, as if the pattern were displayed.
Figure 8B:
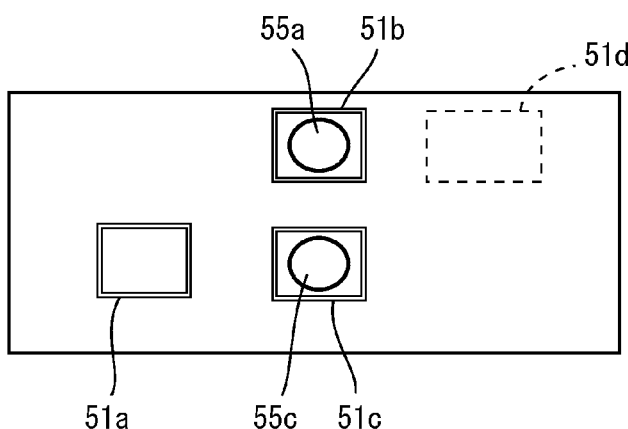
FIG. 8B is a diagram illustrating an example of an entered pattern differing from the lock release pattern of FIG. 8A, where the key lock will not be released.

In the example of FIG. 8A, the input suggestion region 51b, out of the input suggestion regions 51a to 51c, and the region 51d outside the input suggestion regions are registered as a lock release pattern. Although the region 51d is included in the lock release pattern, it is not displayed in the form of an input suggestion region in the input request pattern. In this example, the key lock is released if both the region 51b and region 51d included in the lock release pattern are touched, as indicated by the circles 55a and 55b in FIG. 8A. The key lock is not released if, as shown in FIG. 8B, a touch input occurs in the region 51c, which is not included in the lock release pattern (circle 55c of FIG. 8B), or no touch input occurs in the region 51d included in the lock release pattern.

In variations of the lock release patterns illustrated in FIGS. 5A, 6A and 8A, some regions included in a lock release pattern may not displayed in the form of input suggestion regions in the input request pattern. In such implementations, the user performs a touch input based on his memory in a region not displayed in the form of an input suggestion region in the input request pattern, while identifying the pattern is more difficult for a third party.

Figure 9A:
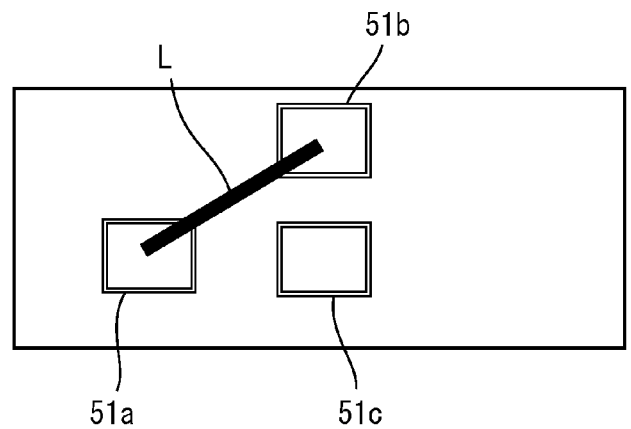
FIG. 9A is a diagram illustrating still another example of a lock release pattern, as if the pattern were displayed.
Figure 9B:
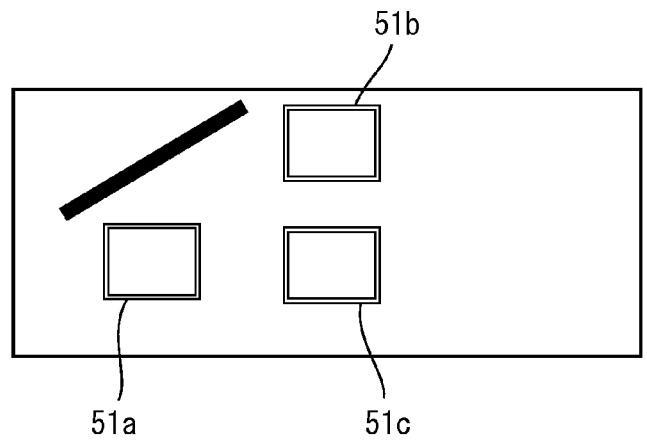
FIG. 9B is a diagram illustrating an example of an entered pattern differing from the lock release pattern of FIG. 9A, where the key lock will not be released.
Figure 9C:
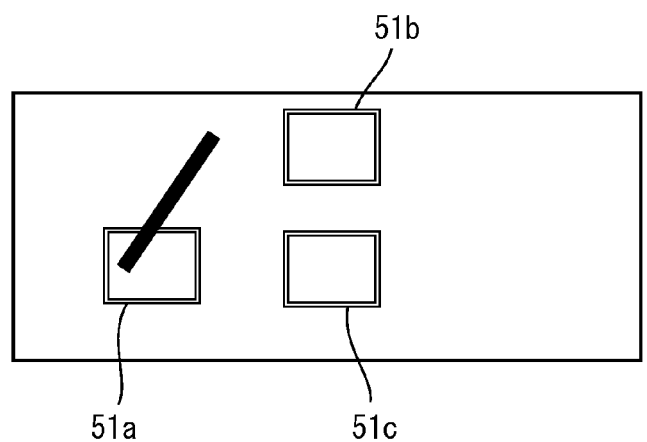
FIG. 9C is a diagram illustrating another example of an entered pattern differing from the lock release pattern of FIG. 9A, where the key lock will not be released.

While in FIGS. 5A, 6A, 7A and 8A the lock release patterns are defined as dots to be touched (more exactly, regions in which a touch input is to occur), a lock release pattern may be defined as one or more lines. For example, FIG. 9A shows an example where a line segment, L, connecting the input suggestion regions 51a and 51b is registered as a lock release pattern. While the lock release pattern shown in FIG. 9A is a line segment, the lock release pattern may be a curve. In the present example, the key lock is released when the user enters the line segment L connecting the input suggestion regions 51a and 51b. On the other hand, the comparison unit 44 determines that the entered pattern does not match the lock release pattern if both ends of the pattern entered by the user are outside the input suggestion regions 51a and 51b, as shown in FIG. 9B, or one end of the pattern entered by the user is outside the input suggestion regions 51a or 51b, as shown in FIG. 9C. This result is sent by the comparison unit 44 to the central controller 34, which determines that the key lock should not be released. If the lock release pattern is defined as a line, the pattern storage memory 43 may store which of the ends of the line segment is the starting point, where the key lock may be released provided that the starting point of the entered pattern is consistent with the starting point of the lock release pattern. Alternatively, a rule may be provided that the relationship between the starting point and end point of the entered pattern that is opposite to that between the starting point and end point of the lock release pattern be acceptable.

Figure 10A:
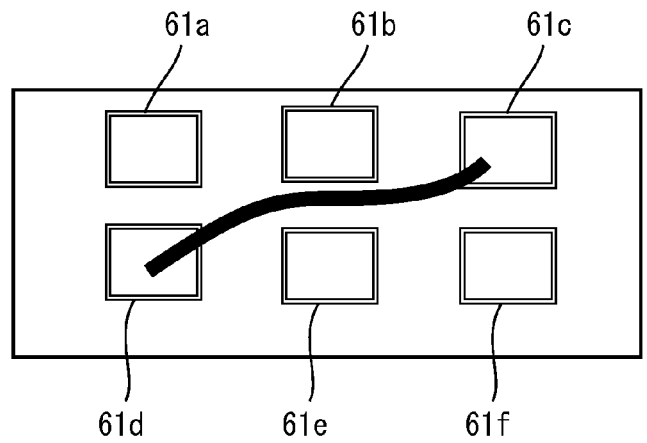
FIG. 10A is a diagram illustrating yet another example of a lock release pattern, as if the pattern were displayed.
Figure 10B:
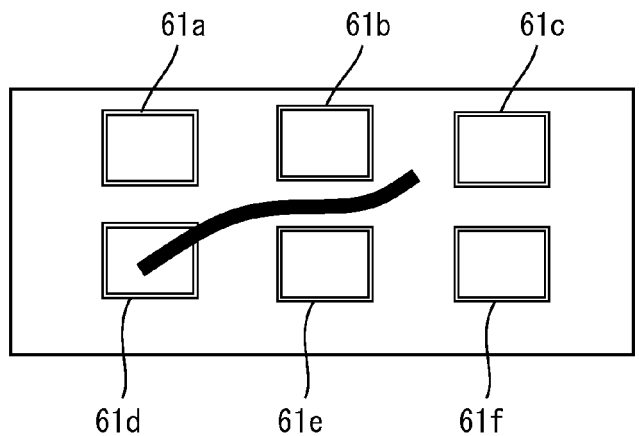
FIG. 10B is a diagram illustrating an example of an entered pattern differing from the lock release pattern of FIG. 10A, where the key lock will not be released.
Figure 10C:
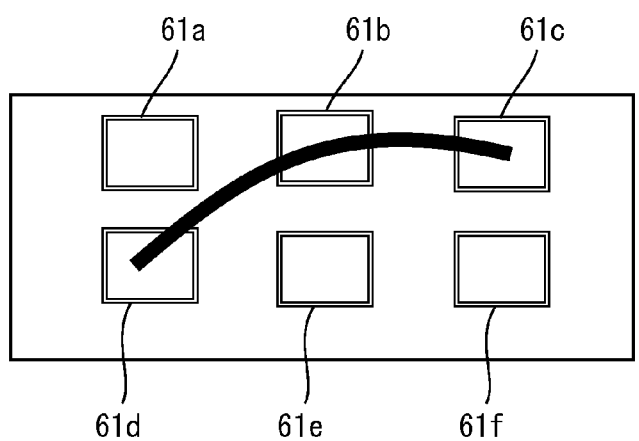
FIG. 10C is a diagram illustrating another example of an entered pattern differing from the lock release pattern of FIG. 10A, where the key lock will not be released.

In the example of FIG. 10A, the liquid crystal display 11 displays six input suggestion regions 61a to 61f, and a curve that connects the input suggestion regions 61c and 61d and does not traverse any of the other input suggestion regions is registered as a lock release pattern. In this implementation, the key lock is not released if one of the ends of the pattern entered by the user is outside the input suggestion regions 61c and 61d, as shown in FIG. 10B. Further, the comparison unit 44 determines that the entered pattern does not match the lock release pattern if each end of the pattern entered by the user is in the corresponding one of the input suggestion regions 61c and 61d but the pattern traverses one of the other input suggestion regions (61b in this example), as shown in FIG. 10C. That is, in the case of the lock release pattern shown in FIG. 10A, the comparison unit 44 determines that the entered pattern matches the lock release pattern provided that both ends of the entered pattern are consistent with those of the lock release pattern and the entered pattern traverses none of the other input suggestion regions along the way.

Although in the example of FIG. 10A a curve that connects 61c and 61d out of six input suggestion regions and traverses none of the other input suggestion regions is registered as a lock release pattern, a lock release pattern may be a curve that connects three or more input suggestion regions.

Figure 11A:
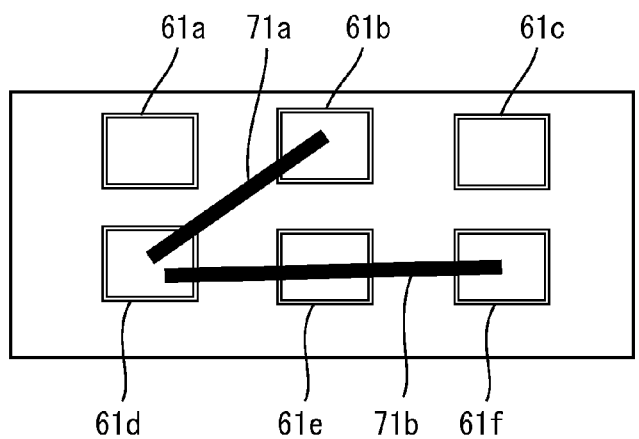
FIG. 11A is a diagram illustrating still another example of a lock release pattern, as if the pattern were displayed.
Figure 11B:
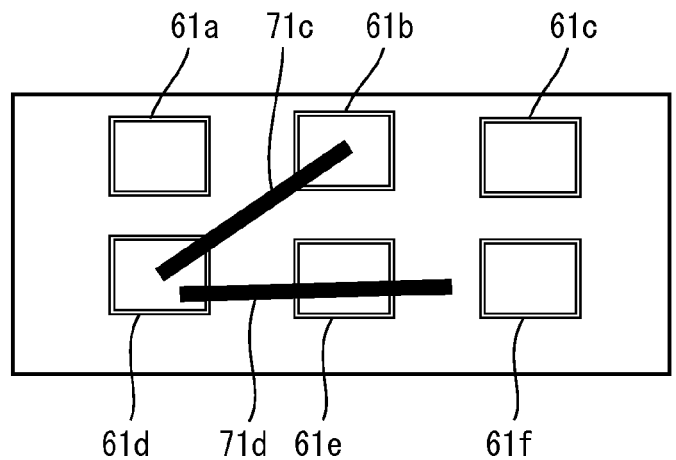
FIG. 11B is a diagram illustrating an example of an entered pattern differing from the lock release pattern of FIG. 11A, where the key lock will not be released.
Figure 11C:
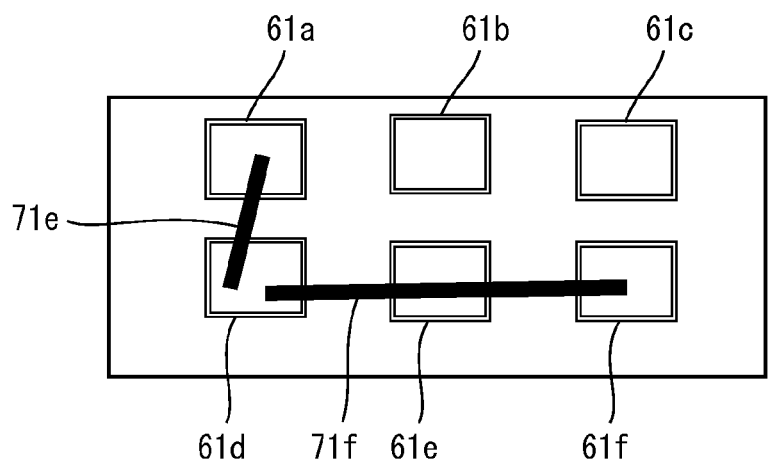
FIG. 11C is a diagram illustrating another example of an entered pattern differing from the lock release pattern of FIG. 11A, where the key lock will not be released.

As shown in FIG. 11A, a lock release pattern including a plurality of lines may be established. In this implementation, too, the key lock is released provided that both ends of each entered pattern portion are consistent with those of the lock release pattern. For example, in the example of FIG. 11B, the line segment 71c matches the line segment 71a of the lock release pattern but one of the ends of the line segment 71d does not match the corresponding one of the ends of the line segment 71b of the lock release pattern. In the example of FIG. 11C, the line segment 71f matches the line segment 71b of the lock release pattern but one of the ends of the line segment 71e does not match the corresponding one of the ends of the line segment 71a of the lock release pattern. Thus, the key lock is not released in the case of the entered patterns shown in FIGS. 11B and 11C.

In addition, it is preferable that a plurality of input request patterns and lock release patterns corresponding to these input request patterns are registered in advance and the user may decide on which input request pattern to use each time the key lock is to be released.

[Determination Method Performed by Comparison Unit]

Details of a determination method performed by the comparison unit 44 if the lock release pattern and entered pattern take the form of lines, as in FIGS. 9A to 11A are described below.

Figure 12A:
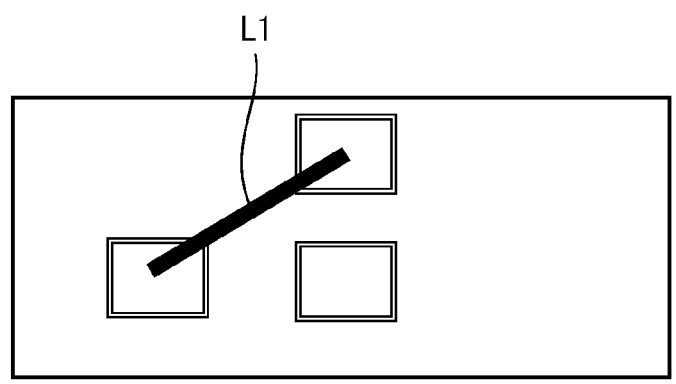
FIG. 12A is a diagram illustrating an example of a line segment entered with a touch on the touch panel.
Figure 12B:
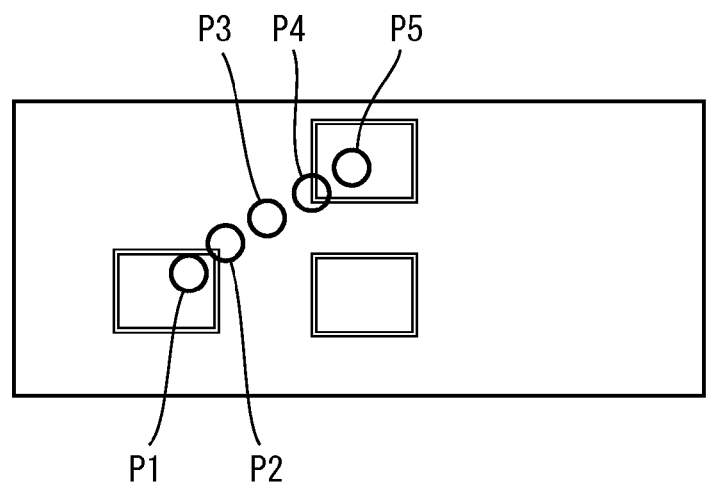
FIG. 12B is a diagram illustrating coordinates determined from the segment shown in FIG. 12A.

If the user enters, with a touch, a line segment L1 on the touch panel 12 as shown in FIG. 12A, the input repetition detecting unit 31, coordinate computing unit 32 and recognition computing unit 33 capture coordinates in a predetermined read cycle such that the coordinates that are actually captured consist of a set of discontinuous dots, P1 to P5, as shown in FIG. 12B.

Based on the coordinates determined by the recognition computing unit 33, the comparison unit 44 expands the points P1 to P5 to regions with an appropriate size (expanded regions A1 to A5). The size of the expanded regions A1 to A5 may be determined depending on various conditions such as length of read cycle or speed of movement of touch input such that the regions partially overlap each other. It is assumed, for example, that it can be predicted based on calculations or experiments that a finger or stylus moves an average distance of 25 mm in one read cycle. In this case, if the dots at the determined coordinates are expanded and the expanded regions are to partially overlap each other, an expanded region preferably has a diameter of about 30 mm.

Figure 12C:
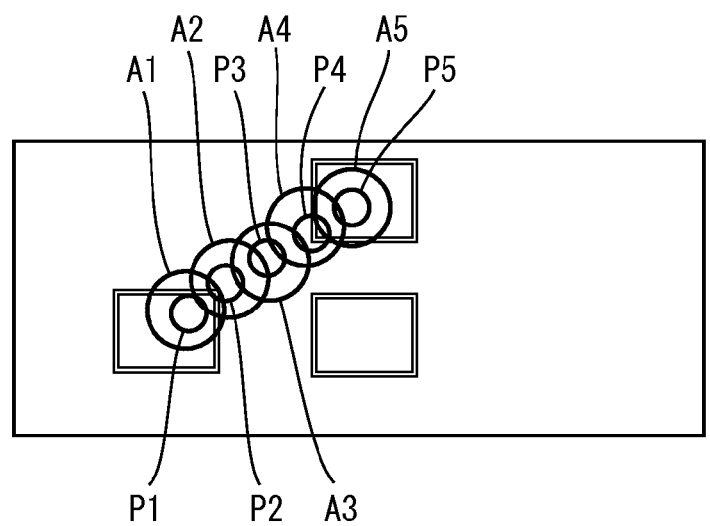
FIG. 12C is a diagram illustrating connected regions obtained by expanding the coordinates shown in FIG. 12B.

As discussed above, the comparison unit 44 expands the dots at the captured coordinates to create regions with a predetermined size, and determines if the expanded regions partially overlap each other. For example, if some expanded regions do not overlap each other, it means that the line is not continuous, which means that the line is interrupted at a point. Then, the comparison unit 44 determines if the expanded regions A1 to A5, as far as they are connected, as shown in FIG. 12C, match the lock release pattern.

[Method of Detecting Touch Input]

The following method of detecting a touch input on the touch panel 12 is preferable.

Assuming that the signal output from the touch panel 12 when it is determined that a touch input has occurred on the touch panel 12 has a level of S1, and the signal output when no touch input has occurred on the touch panel 12 has a level of S2, it is determined whether S1 minus S2 exceeds a predetermined threshold. In the present implementation, the value of S2 is the average level of signals output when no touch input occurs on the touch panel 12 or the value of a signal output immediately before a touch input. Generally, a touch panel 12, of whatever type, detects noise of some kind even when no touch input occurs, and outputs a signal containing noise (S2). As such, subtracting the signal S2 from the signal S1, output when a touch input occurs on the touch panel 12, will ensure precise detection of the presence of a touch input without being affected by noise.

Further, in the touch panel 12, several sensors generally respond to a finger or stylus being in contact with or adjacent to the panel. Sensors at discrete locations may respond, as well. Accordingly, to allow more precise determination of the coordinates of the location where the user has attempted to perform a touch input, it is preferable to define an area with its center at the location where the touch input is estimated to have occurred, determine the location with the maximum sensor output or the location of the weighted center in that area, and consider the determined location to be the location where a touch input has occurred. This will allow more precise determination of the location where the user has performed a touch input, advantageously reducing effects of noise signals from locations near the touch input location.

To remove the effects of the vagueness of human actions, it is preferable that the input repetition detecting unit 31 determines the sum of signals detected over a plurality of read cycles, the sum is compared with a threshold to estimate whether a touch input has occurred and it is determined that one touch input has occurred only when there are a certain number of consecutive cycles where a touch input is estimated to have occurred.

It is assumed, for example, that the read cycle for the touch panel 12 is 0.01 seconds and signals are detected on the touch panel 12 at times $T_1, T_2, T_3, \ldots T_i, T_{i+1} \ldots$, which are separated by 0.01 seconds. In this case, the sum of signals detected at times $T_{k-10}, T_{k-9}, \ldots T_{k-1}$ is determined and the determined sum is compared with a threshold to determine if a touch input occurred in the period from time $T_{k-10}$ to $T_{k-1}$. Similarly, the sum of signals detected at times $T_k, T_{k+1}, \ldots, T_{k+9}$ is determined and the determined sum is compared with a threshold to determine if a touch input occurred in the period from time $T_k$ to $T_{k+9}$. Thus, it is determined whether a touch input lasts for each period of 0.1 seconds (i.e. 10 read cycles) and it is determined that one touch input has occurred if it is determined that a continuous touch input lasted for 0.3 seconds or longer, for example. Such a process will prevent erroneous operation due to a vague touch input.

[Overall Operations of Information Terminal Device]

Figure 13:
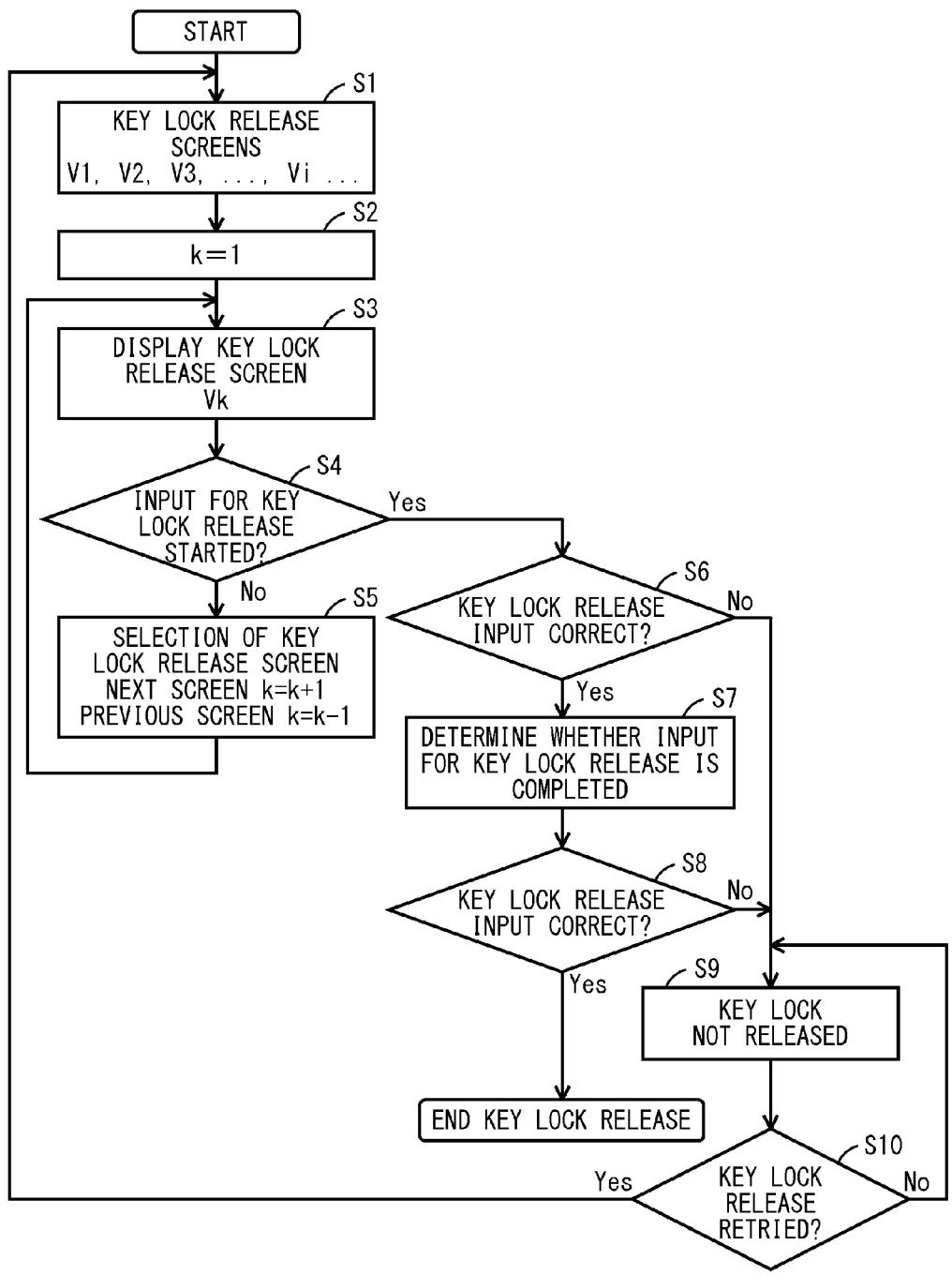
FIG. 13 is a flowchart illustrating the operations of the information terminal device.

Now, an overall flow of operations of the information terminal device 1 will be described with reference to FIG. 13. FIG. 13 is a flow chart illustrating the operations of the information terminal device 1.

When, for example, the user purchases an information terminal device 1 and begins to use it, he selects one or more of a plurality of pre-installed input request patterns, and establishes a lock release pattern that he decides on for each of the selected input request patterns. The lock release pattern(s) that the user established is/are associated with the selected input request pattern(s) and stored into the pattern storage memory 43. The input request pattern(s) stored in the pattern storage memory 43 will be referred to as V1, V2, V3, . . . Vi . . . (step S1).

Next, the parameter k is set to an initial value of 1 (step S2) and the process advances to step S3. At step S3, the liquid crystal display 11 displays a key lock release screen including an input request pattern Vk.

If the user performs a touch input on the touch panel 12 to release the key lock (Yes at step S4), the process advances to step S6. If, on the other hand, the user selects a key lock release screen on the touch panel 12 (No at step S4), the process advances to step S5. At step S5, the parameter is increased or decreased by 1 (one) depending on the selecting operation. Then, the process returns to step S3 to display a key lock release screen including a next input request pattern Vk+1 or a key lock release screen including a previous input request pattern Vk−1.

On the other hand, at step S6, the comparison unit 44 compares the pattern entered by the user with the lock release pattern. Based on the results, the central controller 34 determines if the key lock should be released. Further at step S6, even if the comparison unit 44 determines that the pattern entered by the user matches the lock release pattern, it is determined if the user is finished with pattern entry to release the key lock by determining, at step S7, if a predetermined period of time (3 seconds, for example) has passed after a touch input was interrupted.

After it is determined at step S7 that the pattern entry has been completed, if the comparison unit 44 verifies that the pattern entered by the user matches the lock release pattern (Yes at step S8), the central controller 34 releases the key lock. On the other hand, if the pattern entered by the user does not match the lock release pattern (No at step S6 or S8), it is determined that there is an error in the input for releasing the key lock, such that the central controller 34 does not release the key lock, while continuing image display on the liquid crystal display 11 and input reception operations by the touch panel 12 (step S9). If the user requests a retry of the key lock release operations (Yes at step S10), the process returns to step S1.

The information terminal device 1 performs the process for releasing the key lock using the touch panel 12 in accordance with the above flow.

Effects of First Embodiment

As discussed above, in the information terminal device 1 according to the first embodiment, an input request pattern and a lock release pattern are stored in the pattern storage memory 43 in advance, the input request pattern is displayed on the liquid crystal display 11, and a touch input occurs on the touch panel 12. That is, if the user registers in advance a lock release pattern that he decides on for an input request pattern, he may release the key lock by performing a touch input in accordance with the lock release pattern that he remembers.

Having the user enter with a touch a pattern identical with the lock release pattern has the following advantages. First, the user can easily memorize how to release the lock, and can easily perform the release operations. In addition, it is difficult for a third party to release the key lock.

Methods of releasing the key lock by entering a password consisting of numbers are known. If a password consists of a combination of four numbers, where each number is from 0 to 9, 10,000 combinations are possible. If a password consists of 4 characters, where each character is one selected from the 26 alphabetical characters, 456,976 combinations are possible, meaning a very high indecipherability. In reality, however, combinations of numbers and alphabetical characters often have something to do with the user himself, such as his birthdate or the name of one of his family members, meaning that they are relatively easy to identify. In addition, they are likely to be identified if a picture of the user is secretly taken while he enters the password, for example.

On the contrary, according to the first embodiment, a lock release pattern may include, for example, 25 input suggestion regions, i.e. five rows by five columns, and four regions may be selected where dots are to be entered, resulting in 53,130 combinations for the lock release pattern. This is significantly more difficult to identify than combinations of four numbers only. Further, as shown in FIGS. 7A and 8A, part of the lock release pattern may be outside the input suggestion regions, making it very difficult for a third party to identify the lock release pattern.

Thus, the first embodiment provides an information terminal device that permits simple operations for releasing a lock, allows a user to easily memorize how to release the lock and affords indecipherability even when a picture of the user is secretly taken.

Second Embodiment

Another embodiment of the information terminal device according to the present invention will be described below.

The information terminal device according to the second embodiment disclosed herein is different from the first embodiment in that no input request pattern is displayed on a key lock release screen.

Further, in the information terminal device 1 of the second embodiment, the user can register a lock release pattern that he likes by entering any pattern with a touch into the touch panel 12 of the information terminal device 1.

Figure 14A:
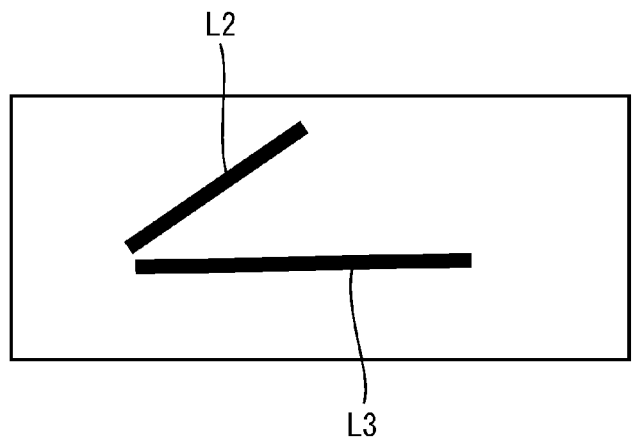
FIG. 14A is a diagram illustrating an example of a pattern entered into a touch panel by a user to register a lock release pattern in an information terminal device according to a second embodiment.
Figure 14B:
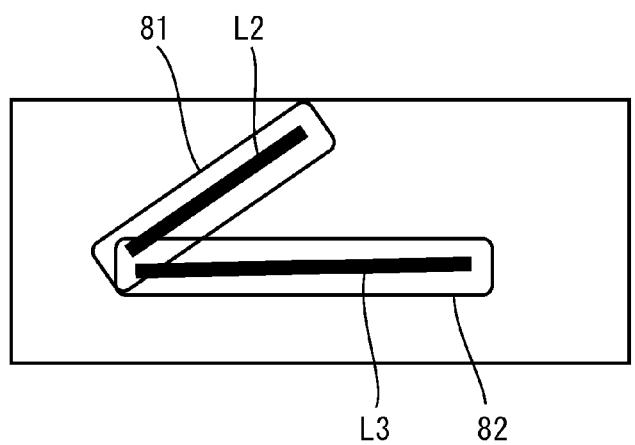
FIG. 14B is a diagram illustrating how an entry allowance is generated from the entered pattern of FIG. 14A.

For example, as shown in FIG. 14A, it is assumed that the user has entered a lock release pattern including two line segments, L2 and L3, into the touch panel 12. As shown in FIG. 14B, rectangular regions 81 and 82 having a predetermined width are generated with their centers at the entered line segments L2 and L3, and these rectangular regions 81 and 82 define an entry allowance for the lock release pattern. The width and length of the rectangular regions 81 and 82 may be established as appropriate. Information on the locations of the rectangular regions 81 and 82 defining an entry allowance is stored into the pattern storage memory 43.

Then, the comparison unit 44 determines whether a pattern entered by the user matches the lock release pattern stored in the pattern storage memory 43 to determine whether the key lock should be released.

In the present embodiment, since no input request pattern is displayed, the user must enter, with a touch, a pattern identical with the lock release pattern into a predetermined region (i.e. the rectangular regions 81 and 82 in the above example) on the lock release screen based on his memory. Advantageously, this makes it more difficult to identify the pattern than in the first embodiment, which displays an input request pattern on a lock release screen.

Figure 14C:
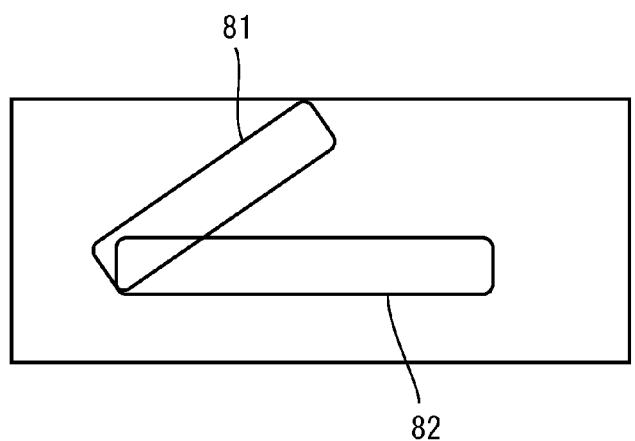
FIG. 14C is a diagram illustrating a lock release pattern generated from the entry allowance of FIG. 14B.
Figure 14D:
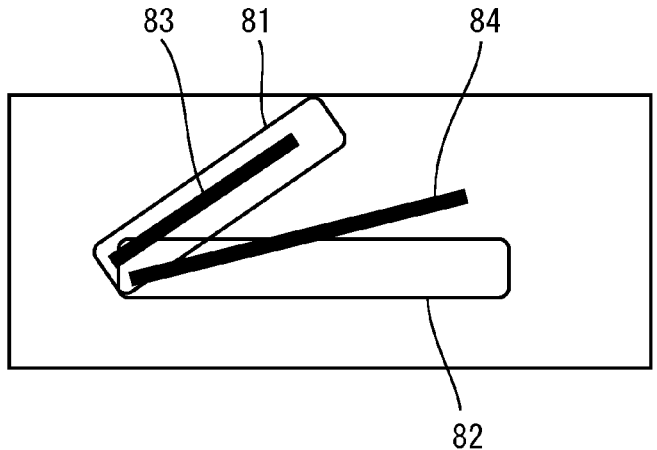
FIG. 14D is a diagram illustrating an example of an entered pattern differing from the lock release pattern of FIG. 14C, where the key lock will not be released.

According to the present embodiment, a lock release pattern as shown in FIG. 14C is stored in the pattern storage memory 43. Then, if a pattern as shown in FIG. 14D is entered, the line segment 83 is contained in the rectangular region 81, while the line segment 84 is not contained in the rectangular region 82. As such, if a pattern as shown in FIG. 14D is entered, the comparison unit 44 determines that the entered pattern does not match the lock release pattern, such that the key lock is not released.

In the present embodiment, it is preferable that the comparison unit 44 is configured to move the entered pattern in a horizontal, vertical or rotational manner as necessary before comparing the entered pattern with the lock release pattern. This is preferable because the present embodiment does not display an input request pattern on the liquid crystal display 11, unlike the first embodiment in which an input request pattern including one or more input suggestion regions can visually assist the user in entering a pattern. In the present arrangement, in the context of the example of FIG. 14C, for example, if the entered pattern does not fit into the rectangular regions 81 and 82, the entered pattern may be moved in a horizontal, vertical or rotational manner and, if the resulting pattern matches the rectangular regions 81 and 82, it is determined that the correct lock release pattern has been entered. This will prevent rejection of the valid user while keeping it difficult to guess the lock release pattern.

Figure 15A:
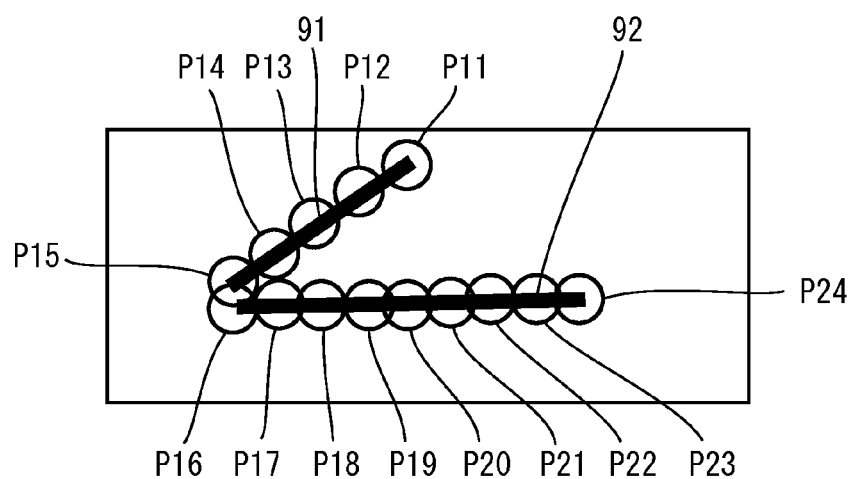
FIG. 15A is a diagram illustrating an example of a pattern entered by the user into the touch panel to register a lock release pattern in the information terminal device according to the second embodiment, as well as coordinates determined from that pattern.
Figure 15B:
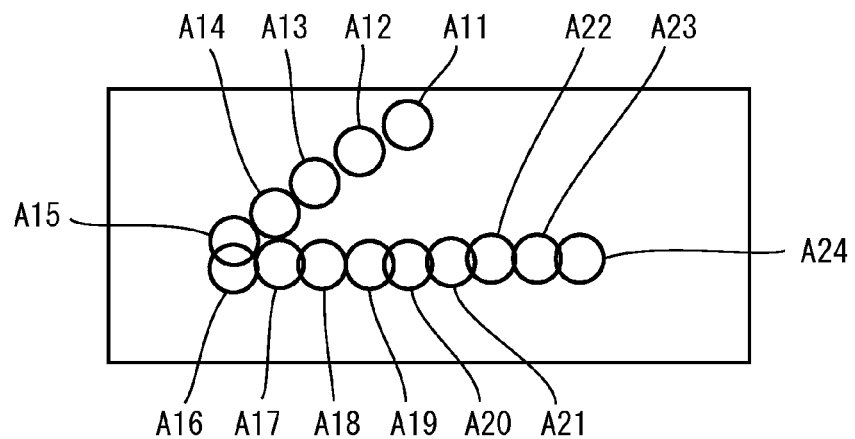
FIG. 15B is a diagram illustrating a lock release pattern generated from the entered pattern of FIG. 15A.
Figure 15C:
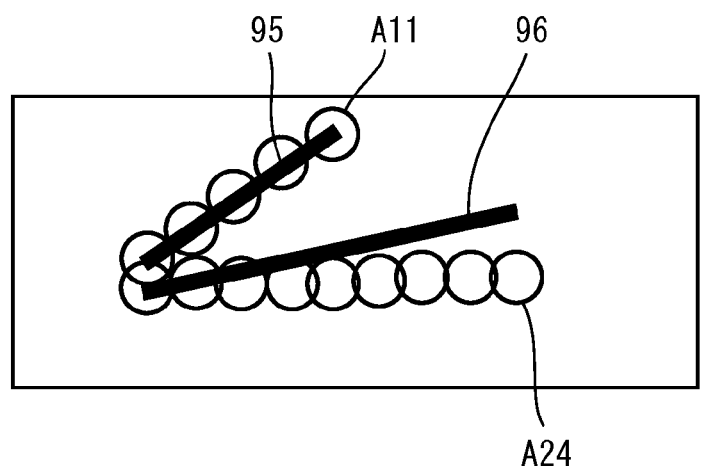
FIG. 15C is a diagram illustrating an example of an entered pattern differing from the lock release pattern of FIG. 15B, where the key lock will not be released.
Figure 15D:
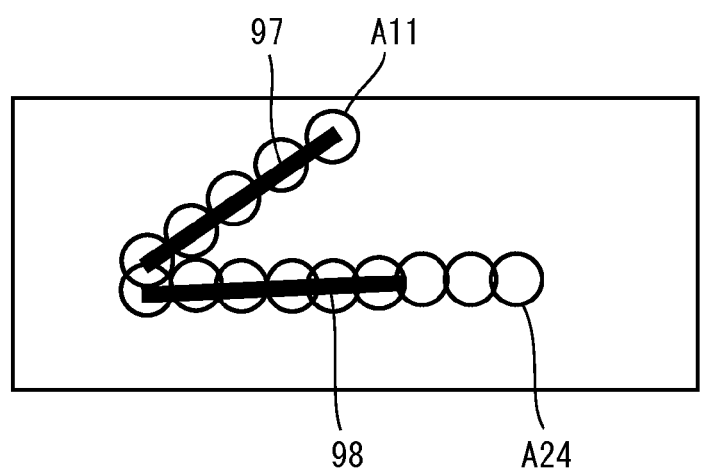
FIG. 15D is a diagram illustrating another example of an entered pattern differing from the lock release pattern of FIG. 15B, where the key lock will not be released.

According to the method illustrated with reference to FIGS. 14A to 14D, a lock release pattern was generated in the form of a rectangular region containing a line segment entered by the user. However, the following example is also possible as a variation of the second embodiment. For example, upon touch input, the line segments 91 and 92 shown in FIG. 15A may be sampled in a certain read cycle to provide coordinates indicated at points P11 to P24. Then, similar to the manner illustrated in the first embodiment, expanded regions A11 to A24 with a predetermined size are generated with their centers at those points, and these regions are stored into the pattern storage memory 43 as a lock release pattern. Then, the comparison unit 44 determines whether a pattern entered by the user with a touch exactly matches the entirety of the expanded regions A11 to A24 included in the lock release pattern to compare the entered pattern with the lock release pattern. For example, in the example of FIG. 15C, the line segment 95 of the pattern entered by the user with a touch matches the set of expanded regions A11 to A15, while the line segment 96 does not match the set of expanded regions A16 to A24. In the example of FIG. 15D, the line segment 97 of the pattern entered by the user with a touch matches the set of expanded regions A11 to A15, while the line segment 98 matches the subset of expanded regions A16 to A21 but not the subset of expanded regions A22 to A24. Accordingly, the key lock is not released in the examples of FIGS. 15C and 15D.

Effects of Second Embodiment

As discussed above, the information terminal device 1 of the second embodiment allows a user to enter a pattern while not displaying an input request pattern on a lock release screen. Advantageously, the information terminal device 1 of the second embodiment achieves increased indecipherability compared with the first embodiment which displays an input request pattern on a lock release screen.

Further, in the information terminal device 1 of the second embodiment, a lock release pattern is generated from a pattern that the user freely enters into the touch panel 12, and is stored into the pattern storage memory 43. As such, the user can create and register a lock release pattern that he can easily memorize but that is difficult to guess for other people.

Third Embodiment

Still another embodiment of the information terminal device of the present invention will be described below.

An information terminal device according to the third embodiment disclosed herein is different from the first and second embodiments in that a board for Japanese chess is displayed as an input request pattern of a key lock release screen. Japanese chess is a board game similar to Western chess, where each of the two players uses various figures, each of which has a fixed range of movement, and captures figures of the other player, and a player wins the game if he captures the figure "king" of the other player.

In the third embodiment, the user stores, as a lock release pattern, into the pattern storage memory 43, a movement of a figure that he chooses as he likes in a direction and of a distance that he decides on as he likes.

Figure 16:
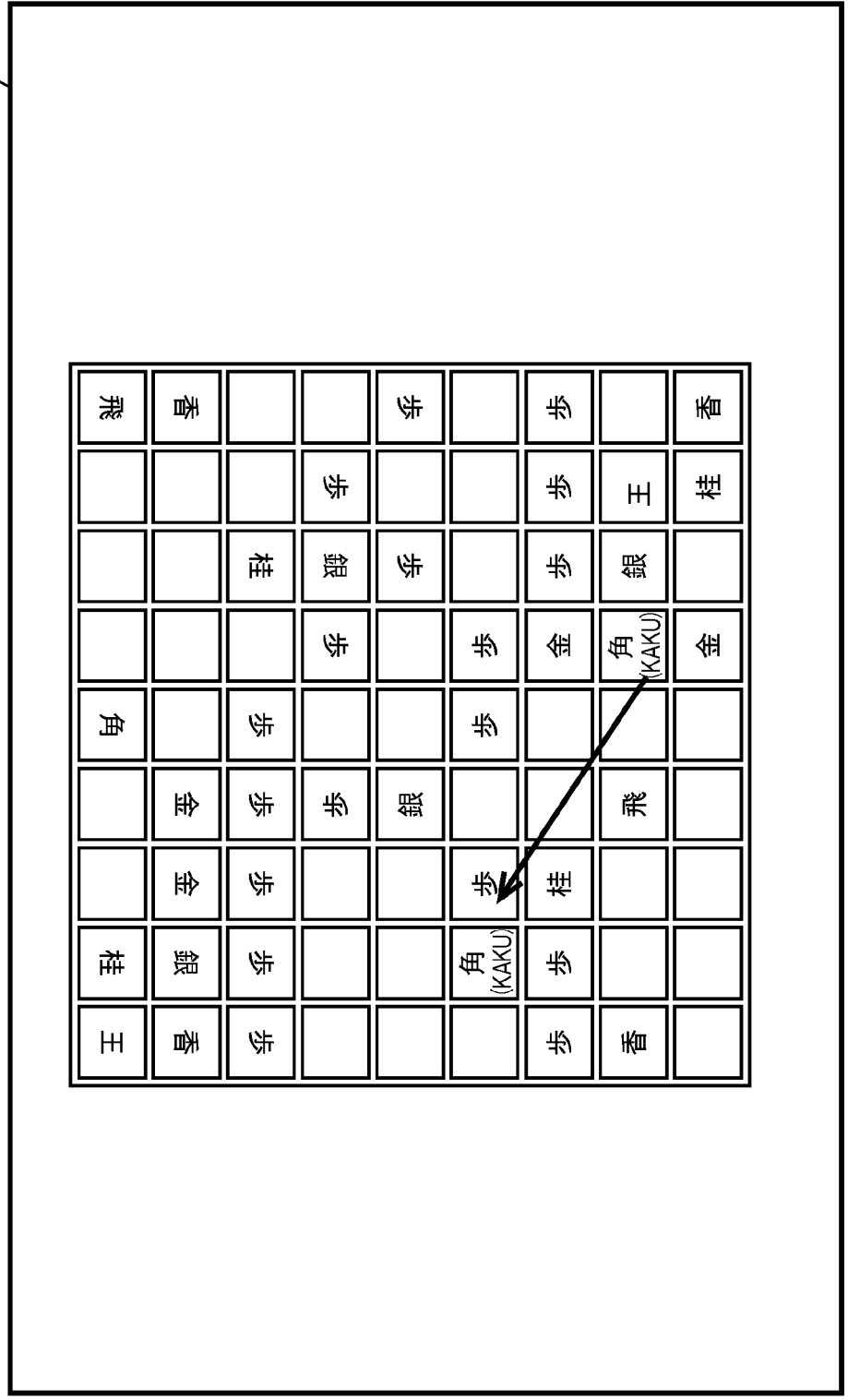
FIG. 16 is a diagram illustrating a board for Japanese chess displayed as an input request pattern in an information terminal device according to a third embodiment.

For example, in the example shown in FIG. 16, the pattern storage memory 43 stores, as a lock release pattern, the rule "moving the figure 'kaku (bishop)' four squares to the left and two squares upward". It is recommended to establish a lock release pattern that contradicts the actual rules of movement of the figure "kaku" in Japanese chess, since it will defy expectations of the human mind and thereby achieve increased indecipherability.

In the third embodiment, it is preferable that the constellation of chess figures displayed as an input request pattern randomly changes each time a key lock release screen is displayed. Even when the constellation changes, the lock release pattern remains the same, for example "moving the figure 'kaku' four squares to the left and two squares upward", as illustrated above. Thus, indecipherability is improved in case a picture of the user is secretly taken while he performs input to release the key lock, since the input request pattern randomly changes.

Effects of Third Embodiment

As discussed above, in the third embodiment, the input request pattern of a key lock release screen is a board for Japanese chess, and the user registers in advance, as a lock release pattern, a pattern of movement of a figure that he decides on under a rule that he decides on. Advantageously, the user can easily memorize a lock release pattern. Further, changing the constellation of chess figures displayed as an input request pattern randomly each time a key lock release screen is displayed will dramatically increase the number of possible input request patterns, thereby maintaining indecipherability even if a picture of the user is secretly taken while he enters a pattern to release the lock.

While the example illustrated herein uses a board for Japanese chess as an input request pattern, the input request pattern may be a pattern in other board games, such as a board for Western chess, for example.

Variations of First to Third Embodiments

While the embodiments of the present invention have been illustrated, the present invention is not limited to the above embodiments and may be modified in various ways within the scope of the invention.

For example, the above embodiments have illustrated an information terminal device including a touch panel-equipped liquid crystal display and a separate hardware keyboard. However, the present invention may be used in an information terminal device that does not include a hardware keyboard and presents a software keyboard on the touch panel display.

Further, while the above embodiments have illustrated an information terminal device where a key lock is released in response to input via the touch panel, mechanisms to be released are not limited to a key lock. That is, the present invention may be utilized to remove the restriction on various uses of the information terminal device. For example, the present invention may be used to remove the restriction on operations including, but not limited to, communication from the information terminal device, access to data stored in the information terminal device, and execution of an application program installed in the information terminal device.

INDUSTRIAL APPLICABILITY

The present invention is industrially useful as an information terminal device that allows the key lock to be released using an input via a touch panel.

The invention claimed is:

1. An information terminal device including a display and a touch panel, comprising:
   a pattern storage memory configured to store a release pattern that is to be entered into the touch panel to remove a restriction on a use of the information terminal device, the release pattern being designated by a user as a graphic pattern;
   a comparison circuit configured to determine whether an entered pattern entered into the touch panel matches the release pattern; and
   a controller configured to remove the restriction on the use of the information terminal device if the comparison circuit determines that the entered pattern matches the release pattern, wherein:
   the pattern storage memory stores an input request pattern suggesting that the release pattern be entered,
   the input request pattern is displayed on the display when the restriction on the use of the information terminal device is to be removed,
   the input request pattern includes a set of input suggestion regions suggesting that the release pattern be entered,
   the release pattern is based on one or more input suggestion regions selected from the set of input suggestion regions,
   a board for a board game is displayed as the input request pattern,
   the release pattern is a movement of one of figures used for the board game, and
   further comprising a pattern generating circuit configured to generate the release pattern based on a pattern entered by the user into the touch panel and to store it into the pattern storage memory.

2. An information terminal device including a display and a touch panel, comprising:
   a pattern storage memory configured to store a release pattern that is to be entered into the touch panel to remove a restriction on a use of the information terminal device, the release pattern being designated by a user as a graphic pattern;
   a comparison circuit configured to determine whether an entered pattern entered into the touch panel matches the release pattern; and a controller configured to remove the restriction on the use of the information terminal device if the comparison circuit determines that the entered pattern matches the release pattern, wherein:

the pattern storage memory stores an input request pattern suggesting that the release pattern be entered, the input request pattern is displayed on the display when the restriction on the use of the information terminal device is to be removed, the input request pattern includes a plurality of input suggestion regions suggesting that the release pattern be entered, the release pattern is based on at least one of the input suggestion regions and a region outside the input suggestion regions, a board for a board game is displayed as the input request pattern, the release pattern is a movement of one of figures used for the board game, and further comprising a pattern generating circuit configured to generate the release pattern based on a pattern entered by the user into the touch panel and to store it into the pattern storage memory.

3. An information terminal device including a display and a touch panel, comprising:

a pattern storage memory configured to store a release pattern that is to be entered into the touch panel to remove a restriction on a use of the information terminal device, the release pattern being designated by a user as a graphic pattern;

a comparison circuit configured to determine whether an entered pattern entered into the touch panel matches the release pattern; and a controller configured to remove the restriction on the use of the information terminal device if the comparison circuit determines that the entered pattern matches the release pattern, wherein:

the pattern storage memory stores an input request pattern suggesting that the release pattern be entered, the input request pattern is displayed on the display when the restriction on the use of the information terminal device is to be removed, the input request pattern includes a plurality of input suggestion regions suggesting that the release pattern be entered, the released pattern is a pattern that only passes one or more of the input suggestion regions, a board for a board game is displayed as the input request pattern, the release pattern is a movement of one of figures used for the board game, and further comprising a pattern generating circuit configured to generate the release pattern based on a pattern entered by the user into the touch panel and to store it into the pattern storage memory.

4. An information terminal device including a display and a touch panel, comprising:

a pattern storage memory configured to store a release pattern that is to be entered into the touch panel to remove a restriction on a use of the information terminal device, the release pattern being designated by a user as a graphic pattern;

a comparison circuit configured to determine whether an entered pattern entered into the touch panel matches the release pattern; and a controller configured to remove the restriction on the use of the information terminal device if the comparison circuit determines that the entered pattern matches the release pattern, wherein:

the pattern storage memory stores an input request pattern suggesting that the release pattern be entered, the input request pattern is displayed on the display when the restriction on the use of the information terminal device is to be removed, the input request pattern includes an input suggestion region suggesting that the release pattern be entered, the release pattern is a pattern located outside the input suggestion regions, a board for a board game is displayed as the input request pattern, the release pattern is a movement of one of figures used for the board game, and further comprising a pattern generating circuit configured to generate the release pattern based on a pattern entered by the user into the touch panel and to store it into the pattern storage memory.

* * * * *